Oct. 11, 1966 T. O. BRADSHAW 3,277,549
FISHING LINE SNAP
Filed July 22, 1964

INVENTOR
THURMAN O. BRADSHAW
BY Head & Johnson
ATTORNEYS

United States Patent Office 3,277,549
Patented Oct. 11, 1966

3,277,549
FISHING LINE SNAP
Thurman O. Bradshaw, 1031 N. 68th E. Ave.,
Tulsa, Okla.
Filed July 22, 1964, Ser. No. 384,446
3 Claims. (Cl. 24—237)

This invention relates to a fish line snap. More particularly, the invention relates to a unitary device for attaching a fishing lure to a fishing line.

The most frequently used method of attaching a fishing lure, or fish hook or the like, to a line is with the use of a snap having a configuration something like a safety pin. The presently used device must be depressed with the use of the finger nails to expose the end of a wire which receives the eyelet of the fishing lure or fish hook. The other end of the presently used snap is an eyelet to which the fishing line must be tied. With the current trend towards the use of small diameter filament lines the average person experiences considerable difficulty in tying a knot to an eyelet which will not pull out. This is especially true with people who are far sighted or with other types of impaired vision and is true of any fisherman tying a knot in cold weather.

It is therefore an object of this invention to provide a new type of snap for fishing lines.

Another object of this invention is to provide a new type of snap for fishing lines characterized by the provision of means whereby the eyelet of a fishing lure, fish hook or the like, is received by the snap in such a way that no depression by the finger nail is required.

Another object of this invention is to provide a new type of snap for fishing lines including means whereby the line may easily be affixed to the snap without requiring the tying of a knot.

Another object of this invention is to provide a new snap for fishing lines for attaching fishing lures, hooks, etc. to the line including means at one end for readily receiving the eyelet of a fishing lure, or hook, or the like without requiring any finger nail pressure and having means at the other end for readily attaching a line in a manner wherein no knot is required.

These and other objects will be more fully set forth and the invention better understood by referring to the following description and claims taken in conjunction with the attached drawings in which:

This invention may be described as a snap for a fishing line. More particularly, but not by way of limitation, the invention may be described as a snap for a fishing line for attaching a fishing lure, or the like, to the line comprising a single length of flexible wire bent to define at one end of the wire an integral eyelet receiving loop formed in a plane of the wire, the end of the wire forming the eyelet receiving loop terminating in a substantially semicircular loop in a plane substantially perpendicular to the plane of the eyelet receiving loop, the terminal semicircular loop partially encompassing the intermediate portion of the wire, and at the other end of the wire a line receiving loop of approximately one and one-quarter turns, the end portion bent to form substantially a radius of the loop, the radius forming end portion extending substantially parallel to the intermediate portion of the wire.

Figure 1:
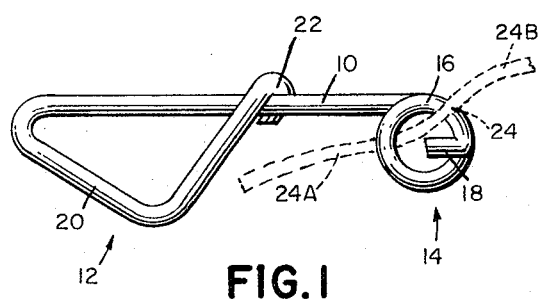
FIGURE 1 is a side view of the snap of this invention showing the end of a fishing line extending thereto preparatory to affixing the line to the hook.

Referring now to the drawings, and first to FIGURE 1, the snap of this invention is shown in side view. The snap is an integral member formed of a single length of a flexible wire bent to define the device. The snap may be said to be composed of three basic portions, that is an intermediate substantially straight portion 10, at one end an integral eyelet receiving loop portion, generally indicated by the numeral 12, and at the other end a fishing line receiving loop portion, generally indicated by the numeral 14. The line receiving loop portion 14 is composed of approximately one and one-quarter turns of the wire forming the device, the turns indicated by the numeral 16. The wire terminates at the line receiving loop portion by an end portion 18 bent rather sharply to form substantially a radius of the loop 16.

Figure 4:
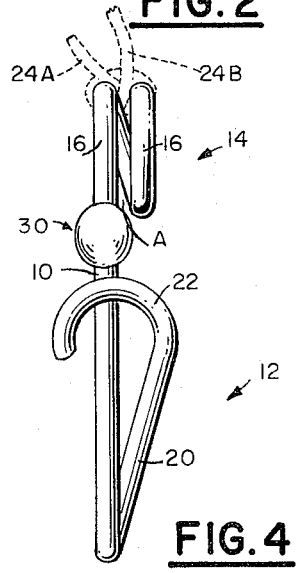
FIGURE 4 is a top view of the snap of this invention showing a fishing line affixed thereto.

Referring to FIGURE 4, a top view, it can be seen that the one and one-quarter turns 16 forming the line receiving loop portion 14 are spaced slightly apart from each other, or at least the device is so constructed that as the line is attached a space indicated by the letter A exists between the turns. In the preferred arrangement the loops 16 are formed to normally be contiguous but easily separable as the line is attached in a manner to be described subsequently.

Referring again to FIGURE 1, the eyelet receiving loop portion 12 includes a single loop formed in the end of the wire opposite the line receiving loop portion 14, the loop 20 being formed in the plane of the intermediate portion 10 of the wire. The loop 20 is preferably substantially of the triangular configuration shown, however this is optional and the loop 20 may take on a variety of configurations, including a spherical configuration. The loop 20 terminates in a substantially semicircular loop portion 22 which is in a plane substantially perpendicular the plane of the eyelet receiving loop 20. The semi-circular loop portion 22 partially encompasses the intermediate portion 10 of the wire forming the device. This is best shown by referring to FIGURE 4.

Figure 2:
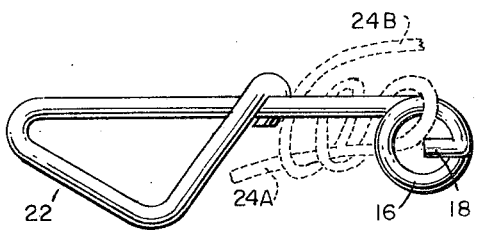
FIGURE 2 is a side view of the snap of this invention showing the line in a second stage of the operation of affixing it to the snap.
Figure 3:
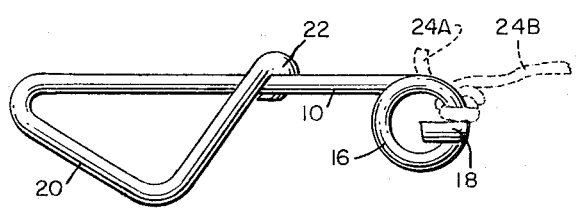
FIGURE 3 is a side view, such as shown in FIGURE 1 and FIGURE 2, but showing the line securely affixed to the snap.

FIGURES 1 through 4 show the method whereby a line is quickly and easily attached to the fishing snap of this invention. The line 24, such as the small diameter monafilament line in current popular use, is first inserted through the turns 16 so that the end portion 24A extends substantially parallel the intermediate wire portion 10. Next, the line 24 is wrapped twice about the intermediate portion 10 adjacent the line receiving loop portion 14, the wrapping including the end portion 24A of the line. This is best shown in FIGURE 2. Next, the line portion 24B is pulled, forcing the loops of line 24 formed about the intermediate portion 10 of the snap between turns 16. The radius forming end portion 18 prevents the line from sliding around the full circumference of the loop 16 and holds portions of line 24 against itself to completely bind the line to the snap. The line secured to the snap is shown in FIGURES 3 and 4. The line when secured to the snap as described will break before it will be pulled from engagement with the snap. Once a user has learned to affix the snap he can affix a line to the snap easily within two or three seconds. This can be done even in cold weather and in fact can easily be done by an operator wearing gloves.

Figure 5:
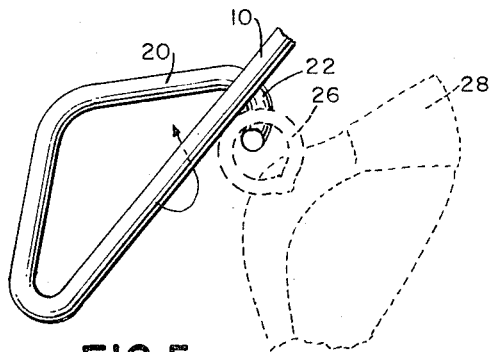
FIGURE 5 is a partial view of the eyelet receiving loop portion of the snap showing the eyelet of a fishing lure in the first step of attaching the lure to the snap.
Figure 6:
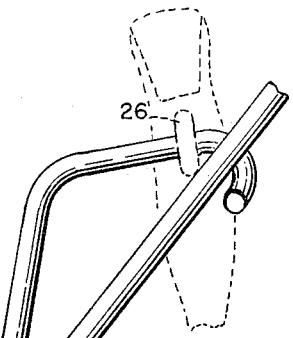
FIGURE 6 shows a partial view of the snap of this invention, as shown in FIGURE 5, showing the second stage of the operation of affixing a fishing lure, or the like, to the snap.

A fishing lure, fish hook, or any other device having an eyelet is easily affixed to the snap as illustrated best in FIGURES 5 and 6. The eyelet 26 of a fishing lure 28 is placed to receive the end of the semicircular loop portion 22. The snap is then rotated relative to the lure 28 so that the eyelet 26 passes beyond the intermediate wire portion 10 of the snap, as shown in FIGURE 6. When it is desired to remove the snap from the lure, the lure is rotated so that the eyelet 26 is substantially in the position as shown in FIGURE 6. The snap is then rotated in the opposite direction quickly releasing the lure.

Figure 7:
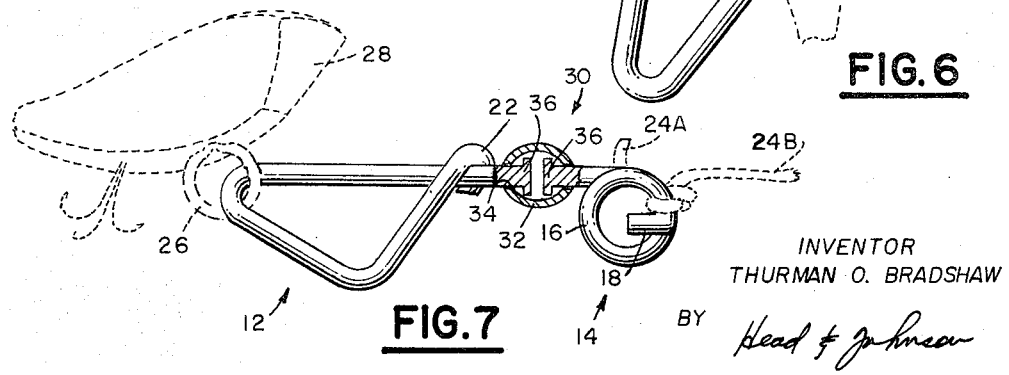
FIGURE 7 is a side view of the snap of this invention showing a fishing line affixed to one end and a fishing plug affixed to the other end as it would appear in use.

FIGURE 7 shows the appearance of the device having a line affixed to one end and a fishing lure at the other.

An alternate embodiment of the invention is shown in FIGURES 4 and 7, and includes a swivel, generally indicated by the numeral 30. Such a swivel which may be in a variety of configurations typically consistent of an envelope 32 having a small opening 34 in each end. The openings 34 receive the ends of wire 10. Each end of the wire is enlarged at 36. The provision of swivel 30 permits the eyelet receiving loop portion 12 to rotate relative to the line receiving loop portion 14. This swivel arrangement is especially useful when the fishing line snap is used on a short line, such as to attach a hook to the end of a trotline staging.

Although the invention has been described with a certain degree of particularity it is manifest that many changes may be made in the details of construction and the arrangement of components without departing from the spirit and scope of this disclosure.

What is claimed is:

1. A snap for a fishing line for attaching a fishing lure or the like having an eyelet to the line comprising a single length of flexible wire bent to define (a) at one end an integral eyelet receiving loop formed in a plane of the wire, the end of the wire forming the eyelet receiving loop terminating in a substantially semicircular loop in a plane substantially perpendicular to the plane of the eyelet receiving loop, the terminal semicircular loop partially encompassing the intermediate portion of the wire, and
    (b) at the other end of the wire a line receiving loop of approximately one and one-quarter turns, the end portion bent to form substantially a radius of the loop, the radius forming end portion extending substantially parallel the intermediate portion of the wire.

2. A snap according to claim 1 wherein the eyelet receiving loop, the line receiving loops and the wire intermediate portion are in substantially the same plane.

3. A snap according to claim 1 including a swivel means intermediate the eyelet receiving loop and the line receiving loop whereby the eyelet and line receiving loops are rotatable to each other.

References Cited by the Examiner

UNITED STATES PATENTS

| D. 34,263 | 3/1901 | Bailey. | |
| 1,867,555 | 7/1932 | Hildebrandt | 24—237 X |
| 2,109,967 | 3/1938 | Brotsker et al. | 24—237 X |
| 2,720,014 | 10/1955 | Caldwell | 24—237 X |
| 3,138,840 | 6/1964 | Rich | 43—42.49 X |

FOREIGN PATENTS

| 63,323 | 3/1941 | Norway. |

WILLIAM FELDMAN, *Primary Examiner.*

D. GRIFFIN, *Assistant Examiner.*